United States Patent
Shao et al.

(10) Patent No.: US 11,175,220 B2
(45) Date of Patent: Nov. 16, 2021

(54) SURFACE DEFECT MEASURING APPARATUS AND METHOD BY MICROSCOPIC SCATTERING POLARIZATION IMAGING

(71) Applicant: Shanghai Institute of Optics And Fine Mechanics, Chinese Academy of Sciences, Shanghai (CN)

(72) Inventors: Jianda Shao, Shanghai (CN); Shijie Liu, Shanghai (CN); Kaizao Ni, Shanghai (CN); Shenghao Wang, Shanghai (CN); You Zhou, Shanghai (CN); Weiwei Wang, Shanghai (CN); Tianzhu Xu, Shanghai (CN); Qi Lu, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 0 days.

(21) Appl. No.: 17/037,606

(22) Filed: Sep. 29, 2020

(65) Prior Publication Data
US 2021/0010927 A1  Jan. 14, 2021

Related U.S. Application Data

(63) Continuation of application No. PCT/CN2019/101282, filed on Aug. 19, 2019.

(30) Foreign Application Priority Data

Jul. 8, 2019 (CN) .......................... 201910609670.6

(51) Int. Cl.
*G01N 21/21* (2006.01)
*G01N 21/49* (2006.01)
(Continued)

(52) U.S. Cl.
CPC ............. *G01N 21/21* (2013.01); *G01N 21/49* (2013.01); *G01N 21/8806* (2013.01);
(Continued)

(58) Field of Classification Search
CPC .... G01N 21/21; G01N 21/49; G01N 21/8806; G01N 2201/0683; G01N 2021/8848;
(Continued)

(56) References Cited

U.S. PATENT DOCUMENTS 5,798,829 A   8/1998   Vaez-Iravani
6,621,571 B1 * 9/2003   Maeda ............... G01N 21/9501
                                                356/237.4

FOREIGN PATENT DOCUMENTS

CN   1563957 A      1/2005
CN   104034426 A    9/2014
(Continued)

OTHER PUBLICATIONS

Bertussi, B., et al., "High-resolution photothermal microscope: a sensitive tool for the detection of isolated absorbing defects in optical coatings," Applied Optics, vol. 45, No. 7, pp. 1410-1415 (Mar. 1, 2006).
(Continued)

*Primary Examiner* — Roy M Punnoose
(74) *Attorney, Agent, or Firm* — Mei & Mark LLP; Manni Li

(57) ABSTRACT

A surface defect measuring apparatus and method by microscopic scattering polarization imaging is provided. The apparatus mainly comprises a laser, a first converging lens, a rotary diffuser, a second converging lens, a diaphragm, a third converging lens, a pinhole, a fourth converging lens, a polarizer, a half-wave plate, a polarizing beam splitter, an X-Y translation stage, a sample, a microscope lens, a quarter-wave plate, a micro-polarizer array, a camera and a
(Continued)

computer. The micro-polarizer array is adopted to realize real-time microscopic scattering polarization imaging of the surface defects; a polarization-degree image is calculated to improve the sensitivity for detecting the surface defects of the ultra-smooth element, and the effective detection of the surface defects of a high-reflective coating element is also realized, and the requirement for rapid detection of the surface defects of a meter-scale large-aperture ultra-smooth element can be met.

2 Claims, 2 Drawing Sheets

(51) Int. Cl.
*G01N 21/88* (2006.01)
*G02B 21/08* (2006.01)
*G02B 21/00* (2006.01)

(52) U.S. Cl.
CPC ..... *G02B 21/0032* (2013.01); *G02B 21/0036* (2013.01); *G02B 21/0068* (2013.01); *G02B 21/082* (2013.01); *G01N 2021/8848* (2013.01); *G01N 2201/0683* (2013.01); *G01N 2201/06113* (2013.01)

(58) Field of Classification Search
CPC . G01N 2201/06113; G01N 2021/4792; G01N 21/9501; G02B 21/082; G02B 21/0032; G02B 21/0068; G02B 21/0036; G02B 5/3025; G01J 4/00
USPC .............................................. 356/367, 237.2
See application file for complete search history.

(56) References Cited

FOREIGN PATENT DOCUMENTS

| | | |
|---|---|---|
| CN | 104062233 A | 9/2014 |
| CN | 105300272 A | 2/2016 |
| CN | 106442564 A | 2/2017 |
| CN | 108036737 A | 5/2018 |
| CN | 109060659 A | 12/2018 |
| JP | 2009283633 A | 12/2009 |

OTHER PUBLICATIONS

Liu, D., et al., "Microscopic scattering imaging measurement and digital evaluation system of defects for fine optical surface," Optics Communications, vol. 278, No. 2, pp. 240-246 (2007).
Gonzalez, R.C., et al., "Digital image processing using MATLAB," Chapter 2—Fundamentals, pp. 13-50, Gatesmark Publishing, 2nd Edition, Knoxville, U.S. (2009).

* cited by examiner

SURFACE DEFECT MEASURING APPARATUS AND METHOD BY MICROSCOPIC SCATTERING POLARIZATION IMAGING

CROSS-REFERENCE TO RELATED APPLICATIONS

The subject application is a continuation of PCT/CN2019/101282 filed on Aug. 19, 2019, which claims priority on Chinese Application No. CN201910609670.6 filed on Jul. 8, 2019 in China. The contents and subject matter of the PCT international application and Chinese priority application are incorporated herein by reference.

FIELD OF TECHNOLOGY

The present invention relates to method and apparatus for detecting surface defect, in particular, surface defect measuring apparatus and method by microscopic scattering polarization imaging for the surface of an ultra-smooth element.

BACKGROUND ART

Large-aperture ultra-smooth elements (the root mean square value of the surface roughness is less than 1 nm) are widely used in high-end equipment such as photolithography systems, high-power laser systems, astronomical telescope systems, and ultra-large-scale integrated circuits. In the high-power laser systems, defects, such as scratches and pits, randomly distributed on the surface of an element modulate the incident light so that the local light field is greatly enhanced and exceeds the damage threshold of the element. The metal ions and contaminants from the residual polishing solution in scratches and pits strongly absorb the incident light causing that the elements are locally cracked and the safe operation of the whole system is directly threatened. In addition, scattering of the incident light by surface defects can cause energy loss of imaging beams in an imaging system, the stray light becomes noise, the signal-to-noise ratio of the system is further reduced, and target signals cannot be extracted and analyzed. In the field of semiconductor industry, defects such as open bubbles and scratches are key factors influencing the yield of wafers and cause very serious influence on the performance of the chips, even leading to the chips to be directly scrapped, thus, they are regarded as "wafer killers".

At present, the methods for detecting surface defects of the ultra-smooth elements mainly comprise manual visual method, microscopic scattering dark-field imaging technique, laser scattering method, and photothermal microscopic imaging technique. Among them, the photothermal microscopic imaging technique (see Bertussi, B., et al., "High-resolution photothermal microscope: a sensitive tool for the detection of isolated absorbing defects in optical coatings," Applied Optics, 2006, 45(7): 1410-1415) is based on the photothermal effect to detect absorptive defects, and is insensitive to structural defects such as scratches and pits, and due to a single-point detection, the measurement efficiency is hugely low so that it cannot be applied to the full-aperture rapid measurement of medium-aperture and large-aperture elements.

The manual visual method relies on human eye observation: in a dark room and clean environment, an inspector holds a high-light flashlight and the light obliquely irradiates the surface of the ultra-smooth element. If there is a defect on the surface of the element, the defect scatters the incident light. The human eyes avoid the reflected light and observe the scattered light emitted by the defect. As the manual visual method is simple and easy to operate, it is still widely applied to the surface defect detection industry at present. However, the manual visual method has two defects: on one hand, physiological limitations such as eye fatigue cause inspectors to be unable to work continuously for extended periods of time; on the other hand, depending on the subjective evaluation, the inspector cannot accurately give the size of the defect. Detection results among different inspectors are often inconsistent and lack transitivity.

The laser scattering method (See U.S. Pat. No. 5,798,829) is a method where the laser is focused and obliquely incident on the wafer surface, and the scattered light generated by a defect is received by a detector. The method is single-point detection. In order to realize full-aperture rapid measurement, a wafer is fixed on a bearing platform, the bearing platform rotates at a high speed along its center axis, and meanwhile, the bearing platform moves in a radial direction in the horizontal plane. The method is not suitable for detecting defects on the surface of a large-aperture and large-weight ultra-smooth optical element.

The microscopic scattering dark-field imaging technique (See Chinese Patent Application Publication No. CN1563957A; and Liu, D., et al., "Microscopic scattering imaging measurement and digital evaluation system of defects for fine optical surface," Optics Communications, 2007, 278(2): 240-246) is characterized in that the collimated light source is obliquely incident on the surface of an element to be measured, and the reflected light is emitted from the other side; and the scattered light generated by a surface defect is collected by the microscopic imaging system positioned along a normal line of the surface of the element, a dark-background and bright-defect image is formed on a camera, and the super-resolution detection is realized. Combined with a digital image processing technique, the position and size information of surface defects are extracted. When using this method, most of the weak scratches are undetected. The method needs to be further improved on the weak scratch detection effect. Furthermore, when the high-reflective coating element is measured, the background grayscale of the image is sharply increased, the defect image contrast is reduced, and the surface defects cannot be effectively extracted.

SUMMARY OF THE INVENTION

In order to overcome the deficiencies of the existing technology, the present invention provides a surface defect measuring apparatus and method by microscopic scattering polarization imaging. According to the method of the present invention, the micro-polarizer array is adopted to realize real-time microscopic scattering polarization imaging of the surface defects; a polarization-degree image is calculated to improve the sensitivity for detecting surface defects of the ultra-smooth element; the effective detection of surface defects of a high-reflective coating element is also realized, and the requirement for rapid detection of surface defects of a meter-scale large-aperture ultra-smooth element can be met.

The present invention provides a surface defect measuring apparatus by microscopic scattering polarization imaging, comprising a laser (1), a first converging lens (2), a rotary diffuser (3), a second converging lens (4), a diaphragm (5), a third converging lens (6), a pinhole (7), a fourth converging lens (8), a polarizer (9), a half-wave plate (10), a polarizing beam splitter (11), an X-Y translation stage (12), a sample (13), a microscope lens (14), a quarter-wave plate (15), a micro-polarizer array (16), a camera (17), and a computer (18);

wherein the laser (1), the first converging lens (2), the rotary diffuser (3), the second converging lens (4), the diaphragm (5), the third converging lens (6), the pinhole (7), the fourth converging lens (8), the polarizer (9), the half-wave plate (10), and the polarizing beam splitter (11) are sequentially arranged in a common optical axis, and the optical axis forms an angle with the normal of the surface to be measured of the sample (13); the first converging lens (2) and the second converging lens (4) are confocal, and the rotary diffuser (3) is located at the confocal position;

the third converging lens (6) and the fourth converging lens (8) are confocal, and the pinhole (7) is located at the confocal position;

the microscope lens (14), the quarter-wave plate (15), the micro-polarizer array (16) and the camera (17) are sequentially arranged in a common optical axis, and the optical axis is positioned in the incident plane and is parallel to the normal of the surface to be measured of the sample (13);

the included angle between the fast axis of the quarter-wave plate (15) and the polarization plane of the s-polarized (or p-polarized) light propagating along the optical axis of the microscope lens (14) is 45°;

the micro-polarizer array (16) is periodically formed by the micro-nano structure of a plurality of 2×2 unit, and each 2×2 unit comprises four transmission light polarization directions of 0°, 45°, 90°, and 135°;

the size of the micro-polarizer array (16) is consistent with the size of the photosensitive chip of the camera (17), the two are tightly attached, and each pixel position is overlapped;

the pixel size of the micro-polarizer array (16) is consistent with the pixel size of the camera (17);

the sample (13) is fixed on the X-Y translation stage (12), and the surface to be measured of the sample (13) is positioned at the object plane of the microscope lens (14); and the output ends of the computer (18) are respectively connected with controlling ends of the rotary diffuser (3), the camera (17) and the X-Y translation stage (12), and the output end of the camera (17) is connected with the input end of the computer (18).

The present invention further provides a method for measuring the surface defect of the ultra-smooth element by using the surface defect measuring apparatus based on the microscopic scattering polarization imaging. The method of the present invention comprises the following steps:

(1) fixing the sample (13) on the X-Y translation stage (12);

(2) sequentially passing the beam emitted by the laser (1) through the first converging lens (2), the rotary diffuser (3) and the second converging lens (4), then the beam being reduced in coherence, collimated and expanded, finely adjusting the diaphragm (5) to select the more uniform part of the exit beam, and sequentially passing the selected uniform beam through a filtering system composed of the third converging lens (6), the pinhole (7) and the fourth converging lens (8) to output a collimated beam, wherein the collimated beam passes through the polarizer (9) and then becomes linearly polarized light, the linearly polarized light sequentially passes through the half-wave plate (10) and the polarizing beam splitter (11), then becomes s-polarized (or p-polarized) light and is oblique incident to the surface to be measured of a sample (13);

(3) rotating the half-wave plate (10) to maximize the intensity of s-polarized (or p-polarized) light output by the polarizing beam splitter (11), wherein the s-polarized (or p-polarized) light is irradiated on the surface to be measured of the sample (13); sequentially passing the scattered light generated by the smooth surface and surface defects of the sample (13) through the microscope lens (14), the quarter-wave plate (15) and the micro-polarizer array (16) to be imaged on the camera (17) so as to obtain a single sub-aperture scattering polarization image;

(4) the X-Y translation stage (12) moving according to a designed route to realize full-aperture measurement of the surface to be measured of the sample (13);

(5) causing the rotary diffuser (3), the camera (17) and the X-Y translation stage (12) to work under the control of the computer (18), and each time the X-Y translation stage (12) moves to a position, capturing by the camera (17) a scattering polarization image and inputting the scattering polarization image into the computer (18) until all sub-aperture scattering polarization images are obtained;

(6) carrying out data processing on each of the scattering polarization images by the computer (18), comprising the steps of:

a. calculating polarization-degree images of all sub-aperture scattering polarization images: the transmission light intensities of the four polarization directions of each 2×2 unit of the micro-polarizer array (16) are $I_0$, $I_{45}$, $I_{90}$ and $I_{135}$ respectively; each scattering polarization sub-aperture image acquired by the camera (17) includes M×N pixels, and the linear polarization degree $D_{(i,j)}$ of each pixel (i, j) is calculated from the light intensities $I_0$, $I_{45}$, $I_{90}$ and $I_{135}$ of four pixels including the pixel (i, j) and other three pixels (i, j+1), (i+1, j) and (i+1, j+1) adjacent to the pixel (i, j):

$$D_{(i,j)} = \frac{\sqrt{(I_0 - I_{90})^2 + (I_{45} - I_{135})^2}}{I_0 + I_{90}}$$

the s-polarized (or p-polarized) light passes through the surface of the sample (13), and the polarization state of scattered light generated by the smooth surface is almost unchanged in the incident plane; after passing through the quarter-wave plate (15), the scattered light has the polarization state close to circular polarization; and $I_0$, $I_{45}$, $I_{90}$ and $I_{135}$ are almost equal, and the linear polarization degree calculated by the above formula is close to 0;

the s-polarized (or p-polarized) light is subjected to multiple scattering via surface defects of the sample, the polarization state of the generated scattered light is changed, and both the s-polarized (or p-polarized) and p-polarized (or s-polarized) components are contained; after passing through the quarter-wave plate (15), the scattered light has the polarization state deviating from circular polarization, and the linear polarization degree calculated by the above formula is obviously changed and is not 0; the more serious the surface defect of the sample (13) is, the greater the linear polarization degree is; the linear polarization degree of the scattered light after passing through the quarter-wave plate (15) calculated by the above formula has a value range of [0, 1]; and repeating the calculation process to obtain the polarization-degree images of all sub-aperture scattering polarization images;

b. calculating a polarization-degree grayscale image: linearly projecting a polarization-degree image having a value of [0, 1] to a grayscale image having a value of [0, 255], namely, $$G_{(i,j)} = \text{INT}(D_{(i,j)} g255)$$

wherein $G_{(i, j)}$ represents the gray value of the pixel (i, j) in a single polarization-degree image after linear projection, and INT is a rounding function; all sub-aperture polarization-degree grayscale images suitable for digital image processing are obtained by projection transformation; and the polarization-degree grayscale image is a dark-background and bright-defect image with uniform background independent of illumination intensity distribution;

c. the size and position information of the surface defects are extracted by utilizing the existing sub-aperture image stitching, median filtering, binarization, morphological hole filling and feature extraction methods. See Gonzalez, R. C., et al., "Digital image processing using MATLAB," 2nd Ed. Gatesmark Publishing: Knoxville, U.S., 2009.

The present invention has the following advantages.

(1) The present invention provides high-sensitivity measurement of surface defects of ultra-smooth elements. According to the present invention, the scattered light generated by surface defects is collected and imaged with the advantages of high contrast and super-resolution measurement of dark-field imaging. The scattered light polarization-degree image independent of illumination intensity distribution is obtained by microscopic scattering polarization image calculation; no matter the illumination intensity is strong or weak, the scattered light polarization degree of the smooth surface area is close to 0, and the scattered light polarization degree of the surface defect is high, so that the problems of low contrast and incapability of effective extraction of defect images including weak scratches caused by uneven illumination sources in the traditional scattering dark-field imaging are effectively solved.

(2) The present invention provides effective measurement of surface defects of high-reflective coating elements. The intensity of scattered light on a smooth surface is $$P_s = P_0 R \left( \frac{4\pi \delta \cos\theta}{\lambda} \right)^2,$$

which is proportional to the reflectance R of the sample surface while other parameters are consistent. When the traditional scattering dark-field imaging technique is used for measuring the surface defect of the high-reflective coating elements, the reflectivity of the high-reflective coating element is far higher than that of a substrate, the background grayscale of the high-reflective coating image is high, the defect contrast is low, and the surface defect cannot be effectively extracted. According to the invention, the polarization-degree image is calculated from the scattering polarization image, and the polarization degree is independent of factors such as illumination intensity, reflectivity, etc. After calculation, the polarization degree of the high-brightness background is close to 0, and the contrast of the defect image is improved, thus the surface defect of the high-reflective coating element is effectively measured.

(3) In the present invention, the micro-polarizer array is adopted to acquire a single image by a camera, so that the intensity values of four polarization directions of 0°, 45°, 90° and 135° can be obtained simultaneously; a polarizer and a rotary machine are not required to be added, the system structure is simplified, the scanning measurement speed is effectively improved, and the technique meets the requirement for rapid detection of surface defects for a meter-scale large-aperture ultra-smooth element.

DETAILED DESCRIPTION OF THE INVENTION

The present invention is described in further detail below with reference to specific drawings and embodiment, which are not taken as limiting the scope of the present invention.

Figure 1:
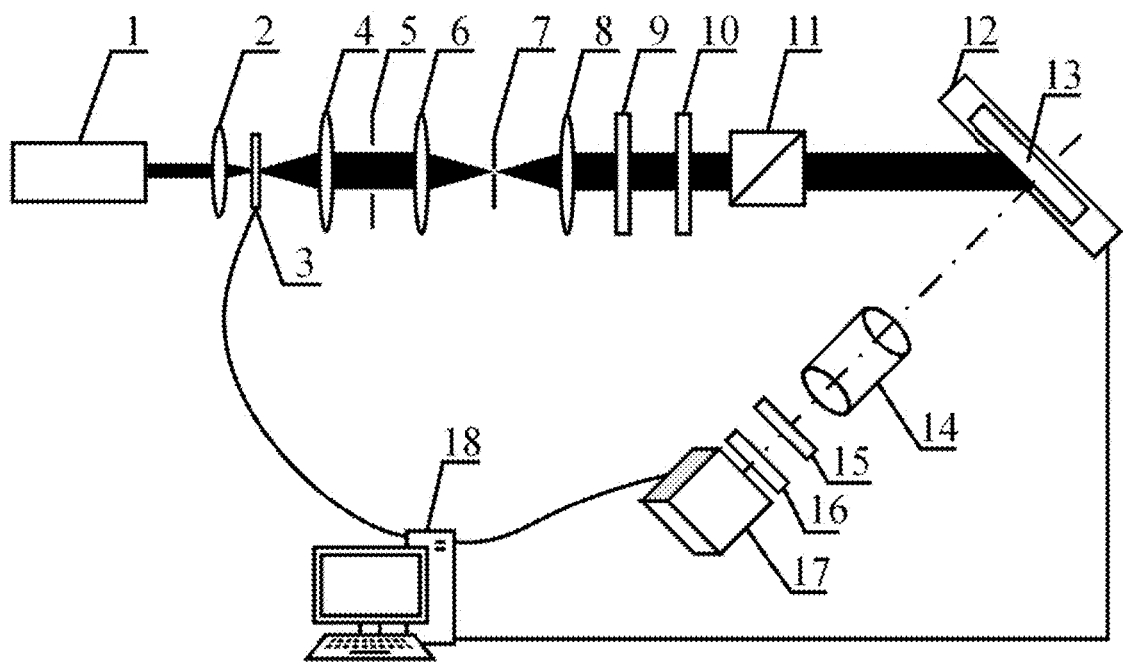
FIG. 1 shows the surface defect measuring apparatus by microscopic scattering polarization imaging of the present invention.

In one embodiment of the present invention as shown in FIG. 1, the surface defect measuring apparatus by the microscopic scattering polarization imaging in the present invention comprises a laser 1, a first converging lens 2, a rotary diffuser 3, a second converging lens 4, a diaphragm 5, a third converging lens 6, a pinhole 7, a fourth converging lens 8, a polarizer 9, a half-wave plate 10, a polarizing beam splitter 11, an X-Y translation stage 12, a sample 13, a microscope lens 14, a quarter-wave plate 15, a micro-polarizer array 16, a camera 17 and a computer 18.

The laser 1, the first converging lens 2, the rotary diffuser 3, the second converging lens 4, the diaphragm 5, the third converging lens 6, the pinhole 7, the fourth converging lens 8, the polarizer 9, the half-wave plate 10, and the polarizing beam splitter 11 are sequentially arranged in a common optical axis. The optical axis forms a certain angle with the normal of the surface to be measured of the sample 13. The first converging lens 2 and the second converging lens 4 are confocal, and the rotary diffuser 3 is located at a confocal position. The third converging lens 6 and the fourth converging lens 8 are confocal, and the pinhole 7 is located at the confocal position.

The microscope lens 14, the quarter-wave plate 15, the micro-polarizer array 16 and the camera 17 are located in the incident plane and have a common optical axis, and the optical axis coincides with the normal line of the surface to be measured of the sample 13.

The included angle between the fast axis of the quarter-wave plate 15 and the polarization plane of the s-polarized (or p-polarized) light propagating along the optical axis of the microscope lens 14 is 45°.

Figure 2:
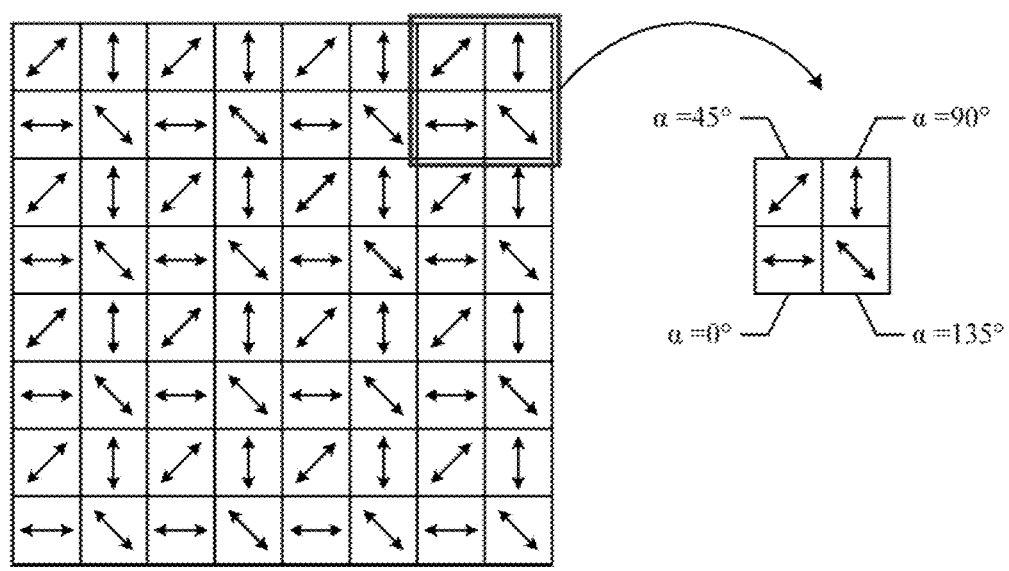
FIG. 2 shows the micro-polarizer array in the present invention.

The micro-polarizer array 16, as shown in FIG. 2, is periodically formed by the micro-nano structure of a plurality of 2×2 unit, and each 2×2 unit comprises four transmission light polarization directions of 0°, 45°, 90° and 135°, respectively. The size of the micro-polarizer array 16 is consistent with the size of the photosensitive chip of the camera 17, the two are tightly attached, and each pixel position is overlapped. The pixel size of the micro-polarizer array 16 is consistent with the pixel size of the camera 17.

The sample 13 is fixed on the X-Y translation stage 12, and the surface to be measured of the sample 13 is positioned at the object plane of the microscope lens 14; and the output ends of the computer 18 is respectively connected with controlling ends of the rotary diffuser 3, the camera 17 and the X-Y translation stage 12, and the output end of the camera 17 is connected with an input end of the computer 18.

Figure 3:
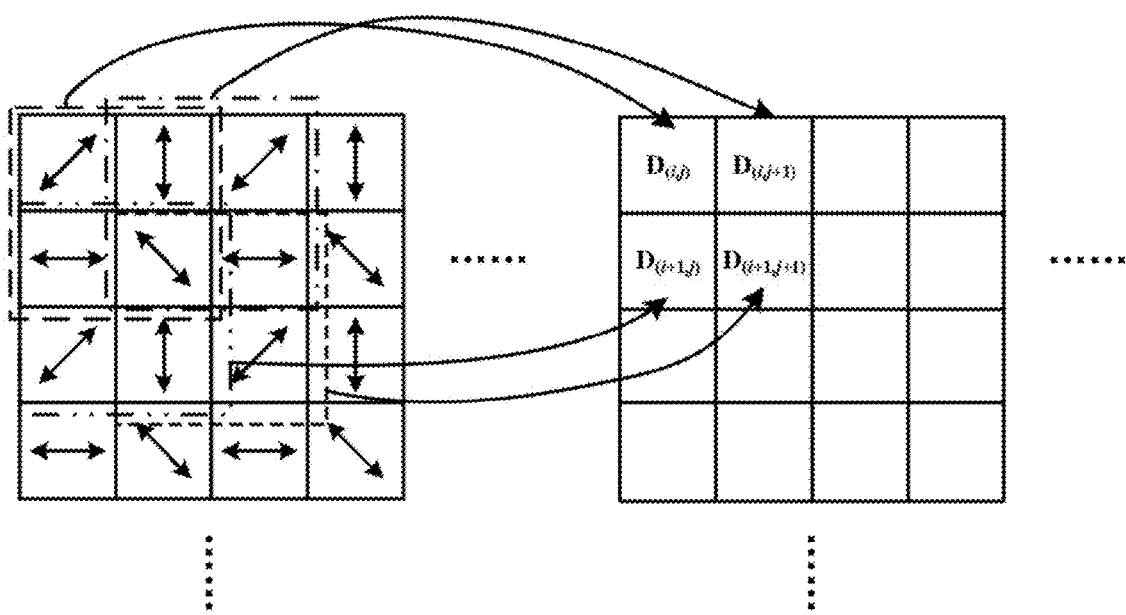
FIG. 3 shows calculation of a surface defect polarization-degree image from a surface defect scattering polarization image in the present invention.

The method for measuring the surface defect of the ultra-smooth element by using the surface defect measuring apparatus based on the microscopic scattering polarization imaging of the present invention comprises the steps of:

(1) fixing the sample (13) on the X-Y translation stage 12;

(2) sequentially passing the beam emitted by the laser 1 through the first converging lens 2, the rotary diffuser 3 and the second converging lens 4, then the beam being reduced in coherence, collimated and expanded, finely adjusting the diaphragm 5 to select the more uniform part of the exit beam, and sequentially passing the selected uniform beam through a filtering system composed of the third converging lens 6, the pinhole 7 and the fourth converging lens 8 to output a collimated beam, wherein the collimated beam passes through the polarizer 9 and then becomes linearly polarized light, the linearly polarized light sequentially passes through the half-wave plate 10 and the polarizing beam splitter 11, then becomes s-polarized (or p-polarized) light and is oblique incident to the surface to be measured of a sample 13;

(3) rotating the half-wave plate 10 to maximize the intensity of s-polarized (or p-polarized) light output by the polarizing beam splitter 11, wherein the s-polarized (or p-polarized) light is irradiated on the surface to be measured of the sample 13; sequentially passing the scattered light generated by the smooth surface and surface defects of the sample 13 through the microscope lens 14, the quarter-wave plate 15 and the micro-polarizer array 16 to be imaged on the camera 17 so as to obtain a single sub-aperture scattering polarization image;

(4) the X-Y translation stage 12 moving according to a designed route to realize full-aperture measurement of the surface to be measured of the sample 13;

(5) causing the rotary diffuser 3, the camera 17 and the X-Y translation stage 12 to work under the control of the computer 18, and each time the X-Y translation stage 12 moves to a position, capturing by the camera 17 a scattering polarization image and inputting the scattering polarization image into the computer 18 until all sub-aperture scattering polarization images are obtained;

(6) carrying out following data processing on each of the sub-aperture scattering polarization images by the computer 18, which comprises the following steps:

a. calculating polarization-degree images of all sub-aperture scattering polarization images: the transmission light intensities of the four polarization directions of each 2×2 unit of the micro-polarizer array 16 are $I_0$, $I_{45}$, $I_{90}$ and $I_{135}$ respectively; the way in which the polarization-degree image of surface defects calculated from the scattering polarization image is shown in FIG. 3; each scattering polarization sub-aperture image acquired by the camera 17 comprises M×N pixels, and the linear polarization degree $D_{(i, j)}$ of each pixel (i, j) is calculated from the light intensities $I_0$, $I_{45}$, $I_{90}$ and $I_{135}$ of four pixels including the pixel (i, j) and other three pixels (i, j+1), (i+1, j) and (i+1, j+1) adjacent to the pixel (i, j):

$$D_{(i,j)} = \frac{\sqrt{(I_0 - I_{90})^2 + (I_{45} - I_{135})^2}}{I_0 + I_{90}}$$

the s-polarized (or p-polarized) light passes through the surface of the sample 13, and the polarization state of scattered light generated by the smooth surface is almost unchanged in the incident plane; after passing through the quarter-wave plate 15, the scattered light has the polarization state close to circular polarization; and $I_0$, $I_{45}$, $I_{90}$ and $I_{135}$ are almost equal, and the linear polarization degree calculated by the above formula is close to 0;

the s-polarized (or p-polarized) light is subjected to multiple scattering via surface defects of the sample, the polarization state of the generated scattered light is changed, and both the s-polarized (or p-polarized) and p-polarized (or s-polarized) components are contained; after passing through the quarter-wave plate 15, the scattered light has the polarization state deviating from circular polarization, and the linear polarization degree calculated by the above formula is obviously changed and is not 0; the more serious the surface defect of the sample 13 is, the greater the linear polarization degree is; the linear polarization degree of the scattered light after passing through the quarter-wave plate 15 calculated by the above formula has a value range of [0, 1]; and repeating the calculation process to obtain the polarization-degree images of all sub-aperture scattering polarization images;

b. calculating a polarization-degree grayscale image: linearly projecting a polarization-degree image having a value of [0, 1] to a grayscale image having a value of [0, 255], namely, $$G_{(i,j)} = INT(D_{(i,j)} g255)$$

wherein $G_{(i, j)}$ represents the gray value of the pixel (i, j) in a single polarization-degree image after linear projection, and INT is a rounding function; all sub-aperture polarization-degree grayscale images suitable for digital image processing are obtained by projection transformation; the polarization-degree grayscale image is a dark-background and bright-defect image with uniform background independent of illumination intensity distribution;

c. the size and position information of the surface defects are extracted by utilizing digital image processing techniques such as the sub-aperture image stitching, median filtering, binarization, morphological hole filling and feature extraction.

Experiments show that the micro-polarizer array is adopted to realize real-time microscopic scattering polarization imaging of the surface defects; a polarization-degree image is calculated to improve the sensitivity for detecting the surface defects of the ultra-smooth element, the effective detection of the surface defects of a high-reflective coating element is also realized, and the requirement for rapid detection of the surface defects of a meter-scale large-aperture ultra-smooth element can be met.

We claim:

1. A surface defect measuring apparatus by microscopic scattering polarization imaging, comprising
a laser (1),
a first converging lens (2),
a rotary diffuser (3),
a second converging lens (4),
a diaphragm (5),
a third converging lens (6),
a pinhole (7),
a fourth converging lens (8),
a polarizer (9),
a half-wave plate (10),
a polarizing beam splitter (11),
an X-Y translation stage (12),
a sample (13),
a microscope lens (14),
a quarter-wave plate (15),
a micro-polarizer array (16),
a camera (17), and
a computer (18);

wherein the laser (1), the first converging lens (2), the rotary diffuser (3), the second converging lens (4), the diaphragm (5), the third converging lens (6), the pinhole (7), the fourth converging lens (8), the polarizer (9), the half-wave plate (10), and the polarizing beam splitter (11) are sequentially arranged in a common optical axis, and the optical axis forms an angle with the normal of the surface to be measured of the sample (13);

the first converging lens (2) and the second converging lens (4) are confocal, and the rotary diffuser (3) is located at the confocal position;

the third converging lens (6) and the fourth converging lens (8) are confocal, and the pinhole (7) is located at the confocal position;

the microscope lens (14), the quarter-wave plate (15), the micro-polarizer array (16) and the camera (17) are sequentially arranged in a common optical axis, and the optical axis is positioned in an incident plane and is parallel to the normal line of the surface to be measured of the sample (13);

an included angle between a fast axis of the quarter-wave plate (15) and a polarization plane of an s-polarized (or p-polarized) light propagating along the optical axis of the microscope lens (14) is 45°;

the micro-polarizer array (16) is periodically formed by a micro-nano structure of a plurality of 2×2 unit, and each 2×2 unit comprises four transmission light polarization directions of 0°, 45°, 90°, and 135°;

the size of the micro-polarizer array (16) is consistent with the size of a photosensitive chip of the camera (17), the two are tightly attached, and each pixel position is overlapped;

the pixel size of the micro-polarizer array (16) is consistent with the pixel size of the camera (17);

the sample (13) is fixed on the X-Y translation stage (12), and the surface to be measured of the sample (13) is positioned at an object plane of the microscope lens (14); and output ends of the computer (18) are respectively connected with controlling ends of the rotary diffuser (3), the camera (17) and the X-Y translation stage (12), and the output end of the camera (17) is connected with the input end of the computer (18).

2. A method for measuring the surface defect of the ultra-smooth element by using the surface defect measuring apparatus based on the microscopic scattering polarization imaging as claimed in claim 1, comprising the steps of:

(1) fixing the sample (13) on the X-Y translation stage (12);

(2) sequentially passing a beam emitted by the laser (1) through a first converging lens (2), a rotary diffuser (3) and a second converging lens (4), then the beam being reduced in coherence, collimated and expanded, finely adjusting a diaphragm (5) to select a more uniform part of an exit beam, and sequentially passing the selected uniform beam through a filtering system composed of the third converging lens (6), the pinhole (7) and the fourth converging lens (8) to output a collimated beam, wherein the collimated beam passes through the polarizer (9) and then becomes linearly polarized light, the linearly polarized light sequentially passes through the half-wave plate (10) and the polarizing beam splitter (11), then becomes s-polarized (or p-polarized) light and is oblique incident to the surface to be measured of a sample (13);

(3) rotating the half-wave plate (10) to maximize the intensity of s-polarized (or p-polarized) light output by the polarizing beam splitter (11), wherein the s-polarized (or p-polarized) light is irradiated on the surface to be measured of the sample (13); sequentially passing the scattered light generated by the smooth surface and surface defects of the sample (13) through the microscope lens (14), the quarter-wave plate (15) and the micro-polarizer array (16) to be imaged on the camera (17) so as to obtain a single sub-aperture scattering polarization image;

(4) moving the X-Y translation stage (12) according to a designed route to realize full-aperture measurement of the surface to be measured of the sample (13);

(5) causing the rotary diffuser (3), the camera (17) and the X-Y translation stage (12) to work under the control of the computer (18), and each time the X-Y translation stage (12) moves to a position, capturing by the camera (17) a scattering polarization image and inputting the scattering polarization image into the computer (18) until all sub-aperture scattering polarization images are obtained;

(6) carrying out data processing on each of the scattering polarization images by the computer (18), comprising the steps of a. calculating polarization-degree images of all sub-aperture scattering polarization images: the transmission light intensities of the four polarization directions of each 2×2 unit of the micro-polarizer array (16) are $I_0$, $I_{45}$, $I_{90}$ and $I_{135}$ respectively; each scattering polarization sub-aperture image acquired by the camera (17) comprises M×N pixels, and the linear polarization degree $D_{(i,j)}$ of each pixel (i, j) is calculated from the light intensities $I_0$, $I_{45}$, $I_{90}$ and $I_{135}$ of four pixels including the pixel (i, j) and other three pixels (i, j+1), (i+1, j) and (i+1, j+1) adjacent to the pixel (i, j):

$$D_{(i,j)} = \frac{\sqrt{(I_0 - I_{90})^2 + (I_{45} - I_{135})^2}}{I_0 + I_{90}}$$

the s-polarized (or p-polarized) light passes through the surface of the sample (13), and the polarization state of scattered light generated by the smooth surface is almost unchanged in the incident plane; after passing through the quarter-wave plate (15), the scattered light has the polarization state close to circular polarization; and $I_0$, $I_{45}$, $I_{90}$ and $I_{135}$ are are almost equal, and the linear polarization degree calculated by the above formula is close to 0;

the s-polarized (or p-polarized) light is subjected to multiple scattering via surface defects of the sample, the polarization state of the generated scattered light is changed, and both the s-polarized (or p-polarized) and p-polarized (or s-polarized) components are contained; after passing through the quarter-wave plate (15), the scattered light has the polarization state deviating from circular polarization, and the linear polarization degree calculated by the above formula is obviously changed and is not 0; the more serious the surface defect of the sample (13) is, the greater the linear polarization degree is; the linear polarization degree of the scattered light after passing through the quarter-wave plate (15) calculated by the above formula has a value range of [0, 1]; and repeating the calculation process to obtain the polarization-degree images of all sub-aperture scattering polarization images;

b. calculating a polarization-degree grayscale image: linearly projecting a polarization-degree image having a value of [0, 1] to a grayscale image having a value of [0, 255], namely, $$G_{(i,j)} = INT(D_{(i,j)} g 255)$$

wherein $G_{(i,j)}$ represents a gray value of a pixel (i, j) in a single polarization-degree image after linear projection, and INT is a rounding function; all sub-aperture polarization-degree grayscale images suitable for digital image processing are obtained by projection transformation; and the polarization-degree grayscale image is a dark-background and bright-defect image with uniform background independent of illumination intensity distribution;

c. extracting size and position information of the surface defects by utilizing the existing sub-aperture image stitching, median filtering, binarization, morphological hole filling and feature extraction methods.

\* \* \* \* \*